March 10, 1970
R. M. O. MAUNSELL
3,499,729
MANUFACTURE OF PHOSPHORIC ACID
Filed May 17, 1967
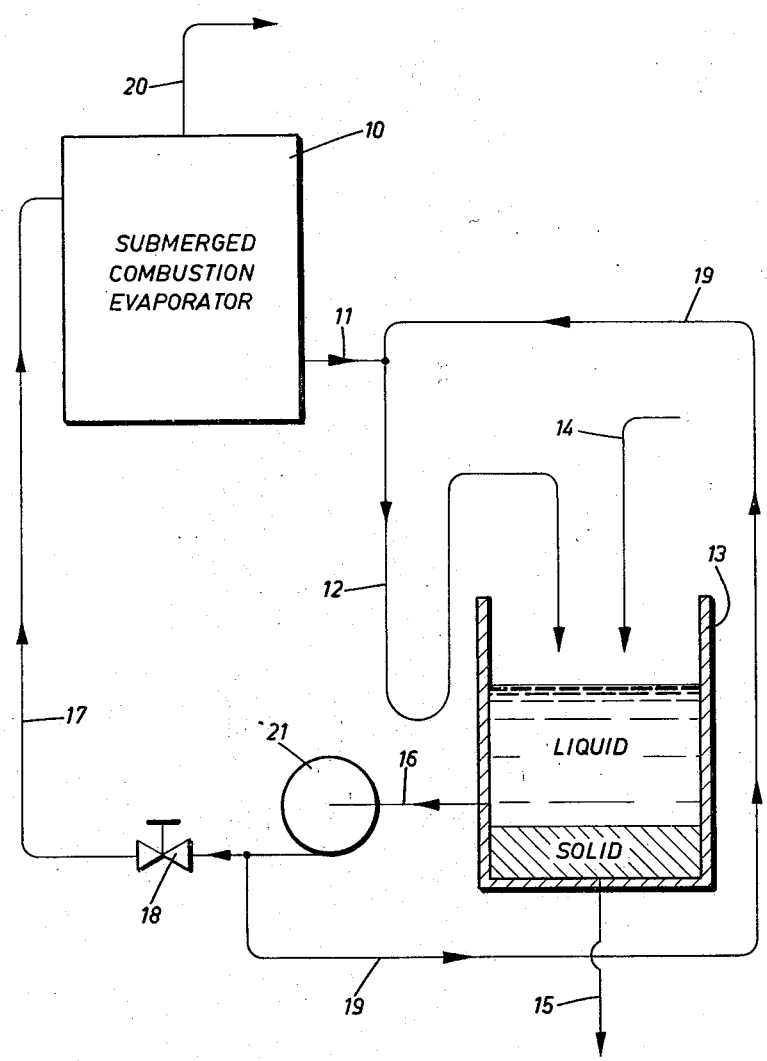
Richard M.O. Maunsell
INVENTOR.
BY
Attorney

United States Patent Office 3,499,729
Patented Mar. 10, 1970

3,499,729
MANUFACTURE OF PHOSPHORIC ACID
Richard M. O. Maunsell, Toronto, Ontario, Canada, assignor to Electric Reduction Company of Canada, Ltd., Toronto, Ontario, Canada
Filed May 17, 1967, Ser. No. 639,189
Claims priority, application Great Britain, Sept. 27, 1966, 43,157/66
Int. Cl. C01b 25/18, 25/22; B01d 3/00
U.S. Cl. 23—165                              19 Claims

ABSTRACT OF THE DISCLOSURE

A process for preparing purified concentrated phosphoric acid wherein dilute WPA is heated in a distillation vessel to a temperature sufficient to volatilize $P_2O_5$ and water, thereby forming an aerosol, with the liquid product acid being recovered from the aerosol is improved by transferring effluent from the distillation vessel to a separation vessel in which solids are separated from residual impure acids, and then recycling the liquid phase in the separation vessel to the distillation vessel.

---

This invention relates to the purification and concentration of wet process or other impure phosphoric acid, hereinafter called "WPA."

This invention is an improvement on the invention described in co-pending patent application Ser. No. 376,874, filed June 22, 1964, now Patent No. 3,404,954, for Manufacture of Phosphoric Acid, James H. E. Jeffes and Richard M. O. Maunsell, the disclosure of which is incorporated herein by reference thereto.

In the aforementioned application there is disclosed a process in which WPA is heated in a submerged combustion evaporator by direct contact with gases issuing immediately from a flame not containing a substantial excess of either comburant, and at least as hot as that obtainable by burning a hydrocarbon fuel, such as a hydrocarbon gas in the stoichiometric amount of air, whereby a rapidly moving mixture of gas and liquid is produced, and evaporation of a substantial proportion not only of the water, but also of the $P_2O_5$, which may be wholly or partly combined with water, is brought about, removing the gas/liquid mixture to a region where the temperature is such that $P_2O_5$ acids condense into the gas phase in the form of an aerosol but is above that at which any volatile impurity in the gas mixture will condense on the aerosol particles, and leading the aerosol, if necessary after separation from entrained impure acid, into a scrubber in which the aerosol particles are caused to coalesce while still being maintained at a temperature above that at which any volatile impurity will condense thereon. Subsequently, it has been found that in some cases it may be preferred to employ slightly less oxygen, i.e., up to 15% less oxygen, than that required for complete combustion of the hydrocarbon gas, since this will cause a reduction in the sulphate content of the purified acid.

In the practice of this process, in order to obtain a good yield of $P_2O_5$, flame temperatures of the order of 1,600° C. or higher, and a bulk acid temperature of 350° C.–550° C. are desirable, and use is made of a submerged combustion evaporator of unique design. In one embodiment, this evaporator consists of a pot containing a downwardly projecting burner tube reaching a point near the bottom of the pot. An annular space is formed between the pot and the tube. Above this the internal diameter of the pot is increased to give a space of greatly increased cross-sectional area. Fresh acid is introduced continuously into the pot, and spent acid is withdrawn continuously. The combustion gases issue at high velocity and high temperature from the burner tube, and this region is highly turbulent. It may be noted that in this region of high temperature where an aerosol is being formed, turbulence is an advantage rather than a disadvantage. The gases are intimately mixed with the liquid and carry it up through the annular space. The apparatus preferably is made pressure tight and operates at a pressure of 5–6 p.s.i.g.

Since turbulence at the region of the burner tip is an advantage rather than otherwise, a plain cylindrical tube with a constricted high velocity exit port or ports can be used. This prevents ingress of splashed liquid and deposition of solids at the burner tip.

While the process and apparatus described in the aforementioned application offer definite advantages, it has been found that when the WPA employed is derived from Florida rock, if one attempts to obtain more than about 30% by weight of $P_2O_5$, there will be an increasing tendency for solids to accumulate in the evaporator and block the aforementioned annular space or passage.

In accordance with this invention, it has been discovered that the amount of $P_2O_5$ which can be recovered from the gas phase evolved from the submerged combustion evaporator of the aforementioned application can be increased appreciably by means of a recycle system, particulars of which are set out hereinafter.

While the recycle system to be disclosed hereinafter is particularly useful where the WPA has been derived from Florida rock, or from other rocks having relatively large amounts of impurities in the form of $Fe_2O_3$ or $Al_2O_3$, this invention, also is applicable, although not with the same degree of advantage, to the treatment of WPA derived from rocks like Moroccan rock containing relatively small amounts of $Fe_2O_3$ and $Al_2O_3$. By way of contrast, Florida rock typically may have of the order of 1% each of $Fe_2O_3$ and $Al_2O_3$, whereas Moroccan rock typically may have about 0.3% $Al_2O_3$ and about 0.2% $Fe_2O_3$.

It should be noted also that the invention is applicable to any process in which WPA is heated in a distillation vessel to a temperature sufficient to volatilize $P_2O_5$ and water, thereby forming an aerosol, and liquid product acid is recovered from the aerosol. In other words, the recycle system of this invention has wider applicability than just to the process described in the aforementioned application.

Referring to the drawing, which is a flow sheet illustrating one method of carrying out this invention, there is shown a submerged combustion evaporator 10, which may be of a type described in the aforementioned application, and which may operate under the same conditions. WPA and solids, such as various metaphosphates, discharge from evaporator 10 via a line 11 and a seal leg 12 to a separating tank 13 into which they discharge.

WPA to be processed (purified and concentrated) is added to tank 13 via a line 14.

Solids are withdrawn from the bottom of tank 13 via a line 15. On the other hand, the liquid phase in tank 13 is withdrawn therefrom by a pump 21 through a line 16. A part of the liquid withdrawn from tank 13 is cycled or recycled via a line 17, in which there is a flow control valve 18, to evaporator 10, while a part of this liquid flows via a line 19 to line 11 and mixes with the effluent from evaporator 10.

A gas phase containing water vapour, $P_2O_5$ acids and volatile impurities discharges from evaporator 10 via a line 20 and may be processed in the manner described in detail in the aforementioned application to provide concentrated and purified WPA. In this respect, the gas phase may be taken to a region at a temperature such that the $P_2O_5$ acids condense as an aerosol, if this has not already taken place, and the aerosol can be separated from any entrained impure acid. The aerosol is then led to a scrubber from which phosphoric acid is obtained which not only is purified, but also is concentrated in comparison with the original WPA. If the invention is carried out in the submerged combustion apparatus described in the aforementioned application, the $P_2O_5$, water and volatile impurities distill into the bubbles of the combustion products, but the temperature of these bubbles is rapidly and drastically reduced as they mix with the liquid, and the $P_2O_5$ acids condense in them to form the aerosol. The gases, which eventually separate from the liquid, thus contain water vapour, volatile impurities, $P_2O_5$ acid fog and entrained residual acid in liquid form. This mixture is carried to a device such as a cyclone in which the drops of residual acid are separated from gas and acid aerosol. The conditions are controlled so that the temperature of the gas/liquid mixture shortly before separation of the gases is in the range of 350° C. to 650° C., and the bulk acid concentration is in the range of about 75–85% $P_2O_5$. When processing feed acid of a concentration of 30% $P_2O_5$, the temperature range of the gas/liquid mixture is in the range 400° C. to 500° C. preferably 430° C. to 470° C.; with feed acids of 54% $P_2O_5$, this range rises to 500° C. to 650° C.

The aerosol-containing gases from the cyclone are conducted to a scrubber which causes the particles of acid to coalesce. The scrubber typically may consist of a high pressure-drop Venturi into the throat of which is injected some of the purified acid produced by the process. Alternatively, there may be used another type of impingement scrubber such as a packed tower impingement scrubber with co-current downward flow. The scrubber is followed by a second cyclone in which the droplets of acid emerging from the Venturi are separated from the gas stream.

WPA to be concentrated and purified is discharged into tank 13 via line 14 where it mixes with the discharge from seal leg 12. The acid concentration in tank 13 is maintained sufficiently low that solids can settle in tank 13 and be removed therefrom via line 15 for subsequent use. This effect is achieved, in the present embodiment, by mixing the effluent from evaporator 10 with the acid flowing in line 19, although other methods for achieving the desired result may be employed. The use of line 19 is desirable for another reason as well. In this respect, the effluent containing residual impure phosphoric acid and solids in line 11 is at a high temperature, for example, 450° C., and at temperatures of this order is extremely corrosive. If the effluent containing residual impure phosphoric acid and solids in line 11 is allowed to cool without dilution, it would become extremely viscous and difficult to handle. Thus, the effect of adding acid from line 19 to the effluent containing residual impure phosphoric acid and solids from evaporator 10 in line 11 is to both cool and dilute this effluent containing residual impure phosphoric acid and solids, which makes it considerably easier to handle. It should be noted that this approach also is advantageous from a thermal economy point of view. In this regard, the WPA in line 14 is in effect preheated in tank 13, and since the acid introduced into evaporator 10 must be heated therein to a relatively high temperature, say of the order of 350° C.–650° C., preferably 350° C.–550° C., less thermal energy is required for the system than would be the case if the heat of the effluent from the evaporator were lost to the system. It should be noted that the bulk acid temperature in evaporator 10 and hence the temperature of the effluent in line 11, should be at least 350° C. The upper temperature limit is dictated by the corrosive effect of the acid on the lining of the evaporator, by reduction in thermal efficiency at higher temperatures and by available material handling equipment. In practice, temperatures not greater than 650° C. will be employed.

Notwithstanding the foregoing advantages of employing line 19, or what could be termed "internal recycle," it is not absolutely essential to the practice of this invention, although decidedly preferred.

The acid in tank 13 which passes through line 17 is discharged into evaporator 10. The acid in line 16 must be capable of being handled by the handling equipment between line 16 and evaporator 10. It is desirable, therefore, that the temperature of the acid in line 16 be relatively low, say of the order of 80° C.–120° C. Of course, if more expensive handling equipment is used, it is likely that higher temperatures would be tolerated. In general, it is desired that temperatures within this range be maintained in leg 12, tank 13 and lines 16 and 17.

The higher the recycle (flow in line 17), the higher will be the temperature of the acid in line 16 as well as its concentration. If no temperature limitations are imposed by the handling equipment between tank 13 and evaporator 10, any degree of recycle could be employed consistent with there always being enough flow to carry solids out of evaporator 10 via line 11. From a practical point of view, the optimum recycle appears to be between 75% and 100%, i.e., if 100 pounds $P_2O_5$ are introduced into tank 13 via line 14, 175 to 200 pounds $P_2O_5$ will be recycled via line 17.

The effect of employing recycle is to markedly increase the amount of $P_2O_5$ in line 20 and decrease the ratio of $$\frac{P_2O_5 \text{ in solids}}{P_2O_5 \text{ in liquid}}$$

in line 11, as compared with the process described in the aforementioned application.

Using the system shown in the drawing, a process embodying this invention was carried out. The following table sets out the operating conditions and results obtained. In this case 150% recycle was employed, the feed via line 14 being 30% $P_2O_5$.

| Component | Line number | | | | | | |
|---|---|---|---|---|---|---|---|
| | 11 | 12 | 14 | 15 | 17 | 19 | 20 |
| | Flow (lbs./hr.) | | | | | | |
| $P_2O_5$ (total) | [1] 340 | [1] 2,620 | 200 | 40 | 500 | 2,280 | 160 |
| $H_2O$ + other volatile constituents | 75 | 2,440 | 443 | ......... | 518 | 2,365 | [2] 443 |
| Non-volatile constitutents | 15 | 112 | 15 | 15 | 15 | 97 | ......... |
| Solids | 55 | 55 | 0 | 55 | 0 | 0 | 0 |
| Temperature, °C | 520 | 97 | 15–60 | 90 | 90 | 90–74 | 520 |

[1] 40 lbs./hr. $P_2O_5$ as solids.
[2] Products of combustion in submerged combustion evaporator not included.

It will be seen from the foregoing table that $P_2O_5$ recovery (line 20) was $$\frac{160}{200} \times 100 = 80\%$$

The percentage of $P_2O_5$ removed from the system via line 15 was $$\frac{40}{200} \times 100 = 20\%$$

While preferred embodiment of this invention have been disclosed herein, those skilled in the art will appreciate that changes and modifications may be made therein without departing from the spirit and scope of this invention as defined in the appended claims.

What I claim as my invention is:

1. In a process for the preparation of purified concentrated phosphoric acid which comprises heating dilute wet-process phosphoric acid in a distillation vessel to a temperature sufficient to volatilize $P_2O_5$ and water to form a mixture of $P_2O_5$ vapor, water vapor and entrained liquid, and subsequently recovering liquid product acid from said mixture, the improvement wherein an effluent containing residual impure phosphoric acid and solids is transferred from said distillation vessel to a separation vessel wherein said residual phosphoric acid is separated at least partly from said solids, feeding dilute wet-process phosphoric acid into said separation vessel to form with said separated residual phosphoric acid an impure phoshoric acid feed for said distillation vessel, and passing said feed to said distillation vessel.

2. A process as claimed in claim 1 including the step of removing said solids separated from said residual impure acid in said separation vessel therefrom.

3. A process as claimed in claim 1 including the steps of cooling and diluting said effluent containing residual impure phosphoric acid and solids in the course of its transfer from said distillation vessel to said separation vessel.

4. A process as claimed in claim 3 in which said effluent is cooled and diluted by adding thereto acid from said separation vessel after removal of said solids therefrom.

5. A process as claimed in claim 1 in which said feed is recycled from said separation vessel to said distillation vessel at a temperature of from 80° to 120° C.

6. A process as claimed in claim 1 in which the extent of the recycle from said separation vessel to said distillation vessel is equivalent to from 75 to 100% of the total weight of $P_2O_5$ in the dilute wet-process phosphoric acid being treated.

7. A process as claimed in claim 4 in which the extent of the recycle from said separation vessel to said distillation vessel is equivalent to from 75 to 100% of the total weight of $P_2O_5$ in said dilute wet-process phosphoric acid fed into said separation vessel.

8. A process as claimed in claim 5 in which the extent of the recycle from said separation vessel to said distillation vessel is equivalent to from 75 to 100% of the total weight of $P_2O_5$ in said dilute wet-process phosphoric acid fed into said separation vessel.

9. In a continuous process for the preparation of purified concentrated phosphoric acid which comprises continuously contacting dilute wet-process phosphoric acid in a distillation vessel with gaseous combustion products at a temperature sufficient to volatilize $P_2O_5$ and water whereby a rapidly moving gas/liquid mixture is produced and evaporation of a substantial proportion of water and $P_2O_5$ is brought about, said gas-liquid mixture containing $P_2O_5$ vapor, water vapor and entrained liquids, continuously leading said gas/liquid mixture to a separation region wherein said entrained liquid is separated from said mixture, continuously leading the remainder of said gas/liquid phase to a condensation region where the temperature is such that said $P_2O_5$ vapor and said water vapor condense into an aerosol and continuously leading said aerosol from said condensation region into a scrubber in which the aerosol particles are carried to coalesce to form a liquid product acid, the improvement wherein in effluent containing residual impure phosphoric acid and solids is transferred from said distillation vessel to a separator, said residual phosphoric acid is separated from said solids in said separator, feeding dilute wet-process phosphoric acid into said separation vessel to form with said separated residual phosphoric acid an impure phosphoric acid feed for said distillation vessel, and passing said feed to said distillation vessel, whereby the proportion of $P_2O_5$ recovered from said aerosol as liquid product is appreciably increased.

10. A process as claimed in claim 9 in which said gaseous combustion products are obtained by burning a mixture comprising a fuel and from 15% less than up to stoichiometrically equivalent amount of oxygen.

11. A process as claimed in claim 9 in which the bulk acid temperature in said distillation vessel is from 350° C. to about 650° C.

12. A process as claimed in claim 11 including the step of removing said solids separated from said residual phosphoric acid from said separator.

13. A process as claimed in claim 9 including the steps of cooling and diluting said effluent containing residual impure phosphoric acid and solids in the course of its transfer from said distillation vessel to said separator.

14. A process as claimed in claim 13 in which said effluent is cooled and diluted by adding thereto acid from said separation vessel, after removal of said solids therefrom, whereby said effluent is cooled and diluted to reduce corrosion of said separator by said acid and to facilitate the separation of said solids therefrom.

15. A process as claimed in claim 14 in which said liquid phase is recycled from said separator to said distillation vessel at a temperature from 80° C. to 120° C.

16. A process as claimed in claim 15 in which the extent of the recycle from said separator to said distillation vessel is equivalent to from 75 to 100% of the total weight of $P_2O_5$ in the dilute wet-process phosphoric acid fed to the separator.

17. A process as claimed in claim 16 in which said gaseous combustion products are obtained by burning a mixture comprising a hydrocarbon fuel and from 15% less than up to the stoichiometric amount of oxygen.

18. A process as claimed in claim 11 including the steps of cooling said effluent containing residual impure phosphoric acid and solids to a temperature of from 80° to 120° C. and diluting said effluent by adding thereto acid from said separator after removal of said solids from said acid in the course of the transfer of said effluent from said distillation vessel to said separator.

19. A process as claimed in claim 18 including the step of removing said solids from said phosphoric acid from said separator.

References Cited

UNITED STATES PATENTS

| | | | |
|---|---|---|---|
| 3,404,954 | 10/1968 | Jeffes et al. | 23—165 |
| 2,905,535 | 9/1959 | Atkin et al. | 23—165 |
| 3,044,855 | 7/1962 | Young | 23—165 |
| 3,113,063 | 12/1963 | Lanham | 23—165 X |
| 3,266,557 | 8/1966 | Mustian et al. | 23—165 X |
| 3,276,510 | 10/1966 | Austin et al. | 23—165 X |

H. T. CARTER, Primary Examiner